United States Patent [19]
Ford et al.

[11] 4,098,331
[45] Jul. 4, 1978

[54] SOLAR HEAT EXCHANGE PANEL AND METHOD OF FABRICATION

[75] Inventors: Freeman A. Ford, Atherton; Errol Armstrong, Glen Ellen; Richard O. Rhodes, San Francisco, all of Calif.

[73] Assignee: Fafco, Incorporated, Menlo Park, Calif.

[21] Appl. No.: 764,296

[22] Filed: Jan. 31, 1977

Related U.S. Application Data

[60] Continuation of Ser. No. 512,492, Oct. 7, 1974, abandoned, which is a division of Ser. No. 410,630, Oct. 29, 1973, Pat. No. 3,934,323.

[51] Int. Cl.² .......................... F28F 3/12; F28F 9/22; F28F 27/02; F24J 3/02
[52] U.S. Cl. .................................. 165/170; 126/271; 165/171; 165/174
[58] Field of Search .............. 126/271; 165/170, 174, 165/144, 171, 180

[56] References Cited

U.S. PATENT DOCUMENTS

| 1,958,899 | 5/1934 | MacAdams | 165/170 |
| 2,310,234 | 2/1943 | Haug | 165/174 |
| 2,488,623 | 11/1949 | Goeltz | 165/174 |
| 2,707,868 | 5/1955 | Goodman | 165/174 |
| 2,874,941 | 2/1959 | Woolard et al. | 165/170 |
| 2,911,201 | 11/1959 | Gier, Jr. | 165/170 |
| 3,233,662 | 2/1966 | Yuen | 165/170 |
| 3,239,000 | 3/1966 | Meagher | 126/271 |
| 3,239,922 | 3/1966 | Hansson | 165/170 |
| 3,426,841 | 2/1969 | Johnson | 165/178 |
| 3,502,142 | 3/1970 | McGuffey | 165/170 |
| 3,627,039 | 12/1971 | Tiefenbacher | 165/158 |
| 3,648,768 | 3/1972 | Scholl | 165/174 |
| 3,859,980 | 1/1975 | Crawford | 126/271 |

FOREIGN PATENT DOCUMENTS

| 645,802 | 9/1962 | Italy | 165/170 |

*Primary Examiner*—Charles J. Myhre
*Assistant Examiner*—Sheldon Richter

[57] ABSTRACT

A panel having multiple tubular passages extending therethrough and fitted on each end with a fluid tight hollow header. Apertures through one side of the headers place the tubular passages in communication with the interior of the headers. Fluid pumped into one header flows through the tubular passages to the other header, exchanging heat with the environment surrounding the panel as it passes therethrough. The panels are formed to provide a flow restrictive feature at the ends of the through fluid passages so that substantial flow will exist in all passages in all panels in an array of panels. One method for obtaining a fluid tight bond between the headers and the panel involves a forming process utilizing a heated die applied to the panel ends, and a subsequent panel and header material melting process followed by imposing pressure contact between the formed panel ends and the headers to thereby effect a permanent bond or weld.

6 Claims, 13 Drawing Figures

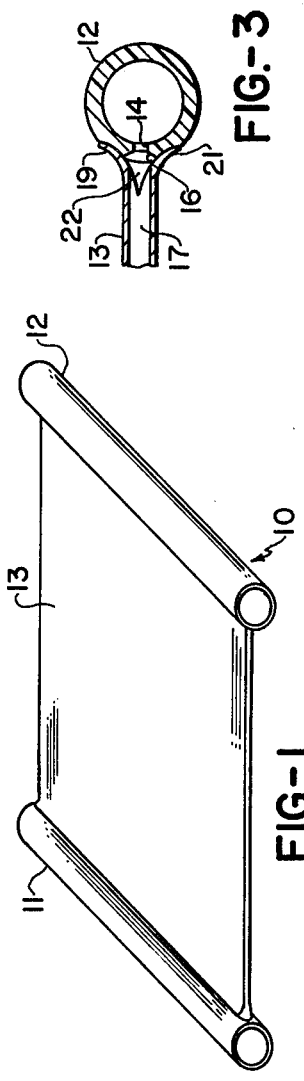
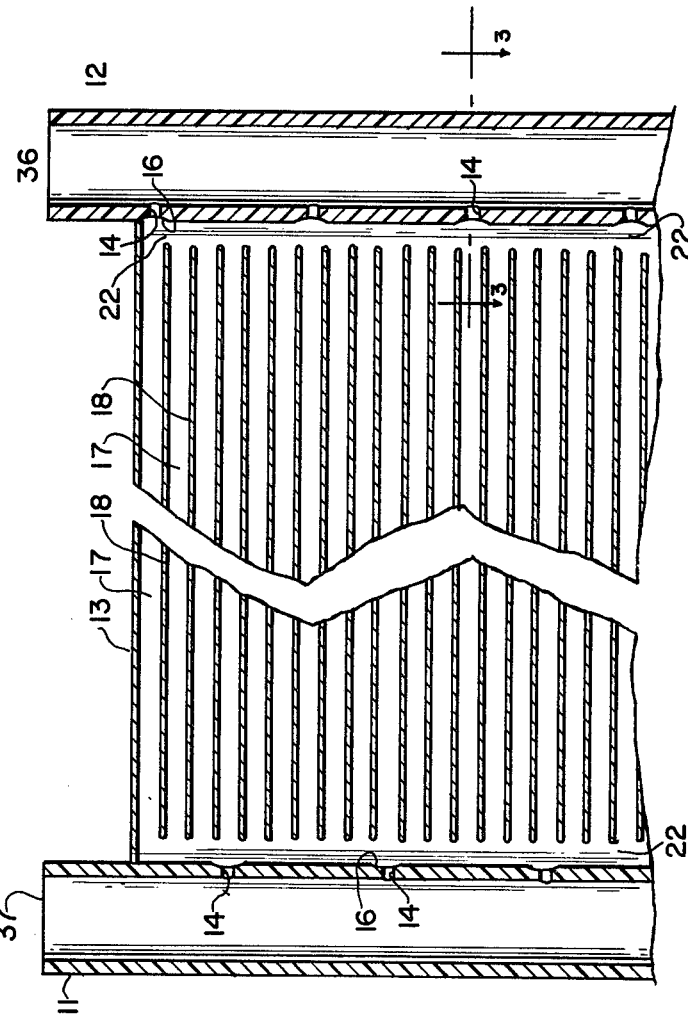
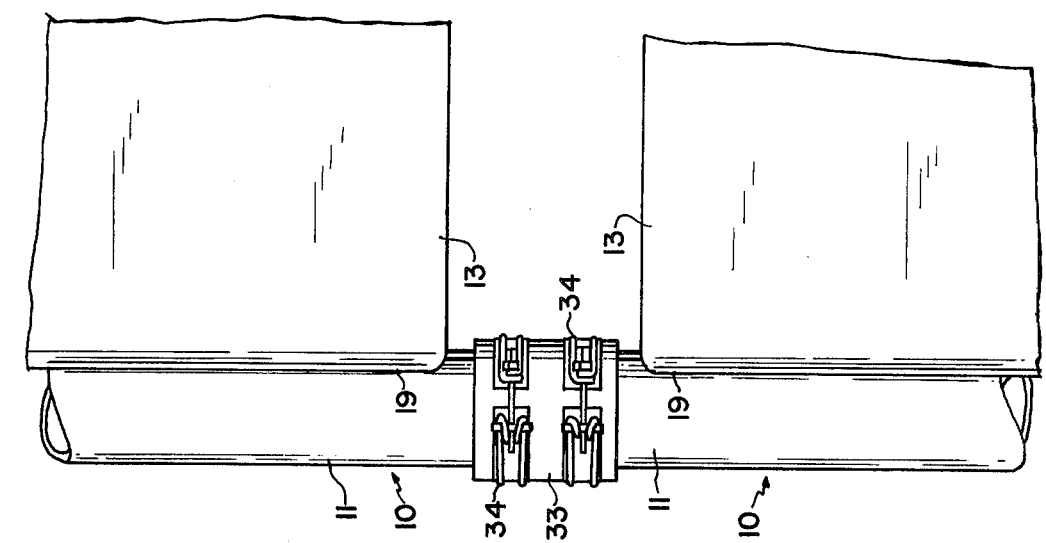

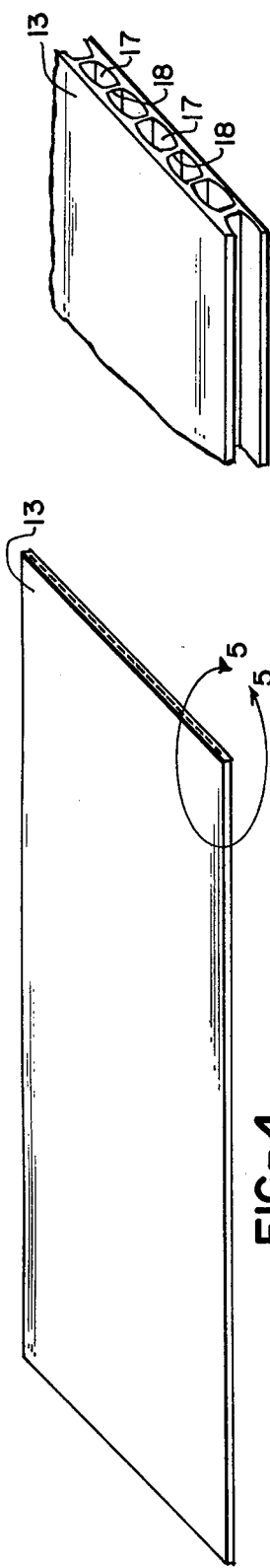
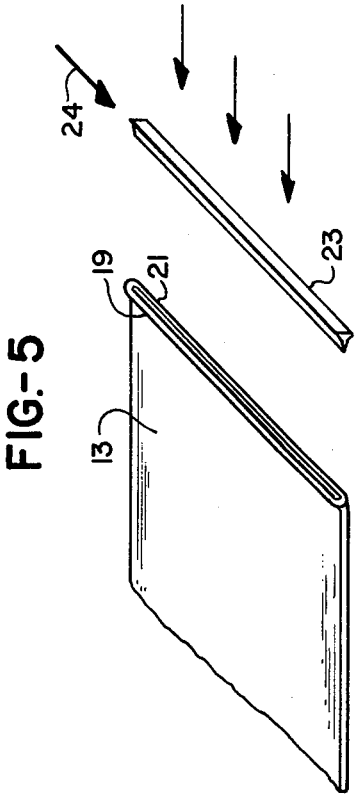
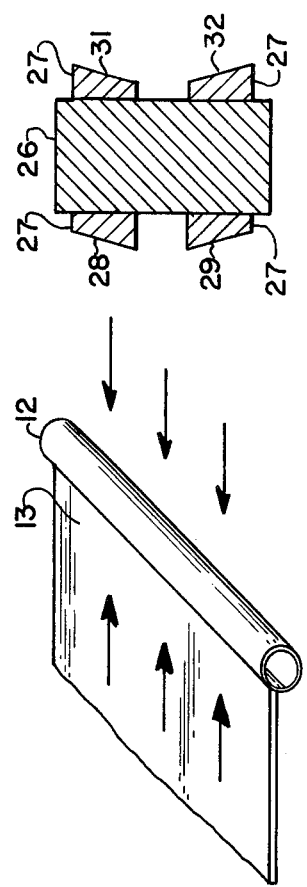
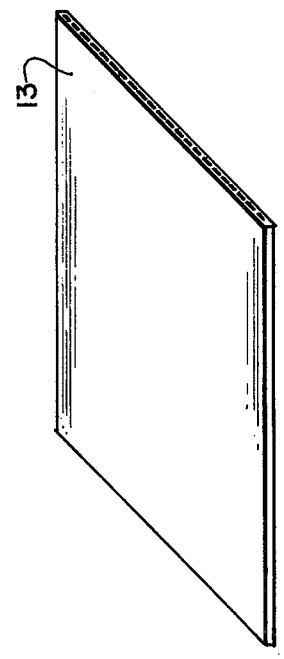
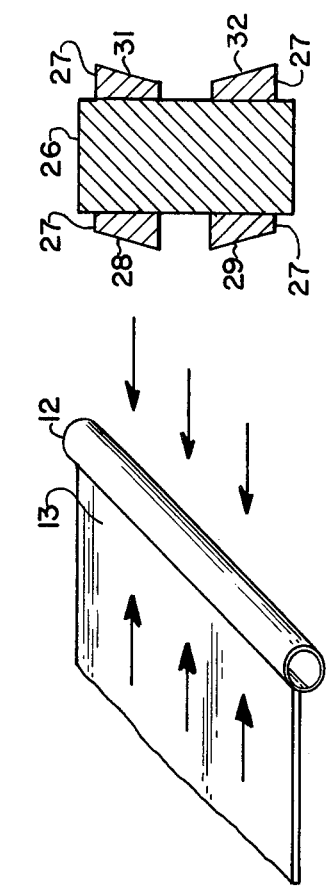
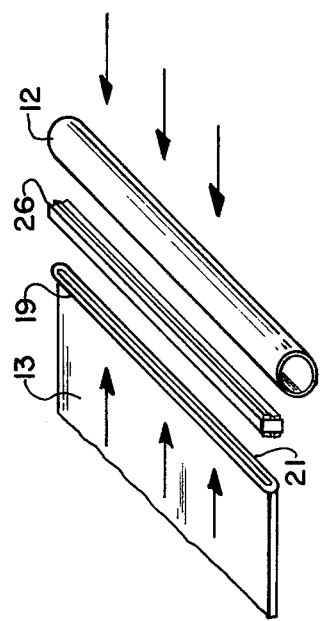
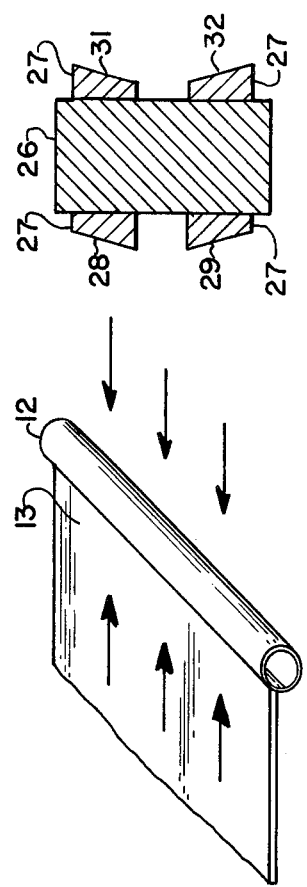

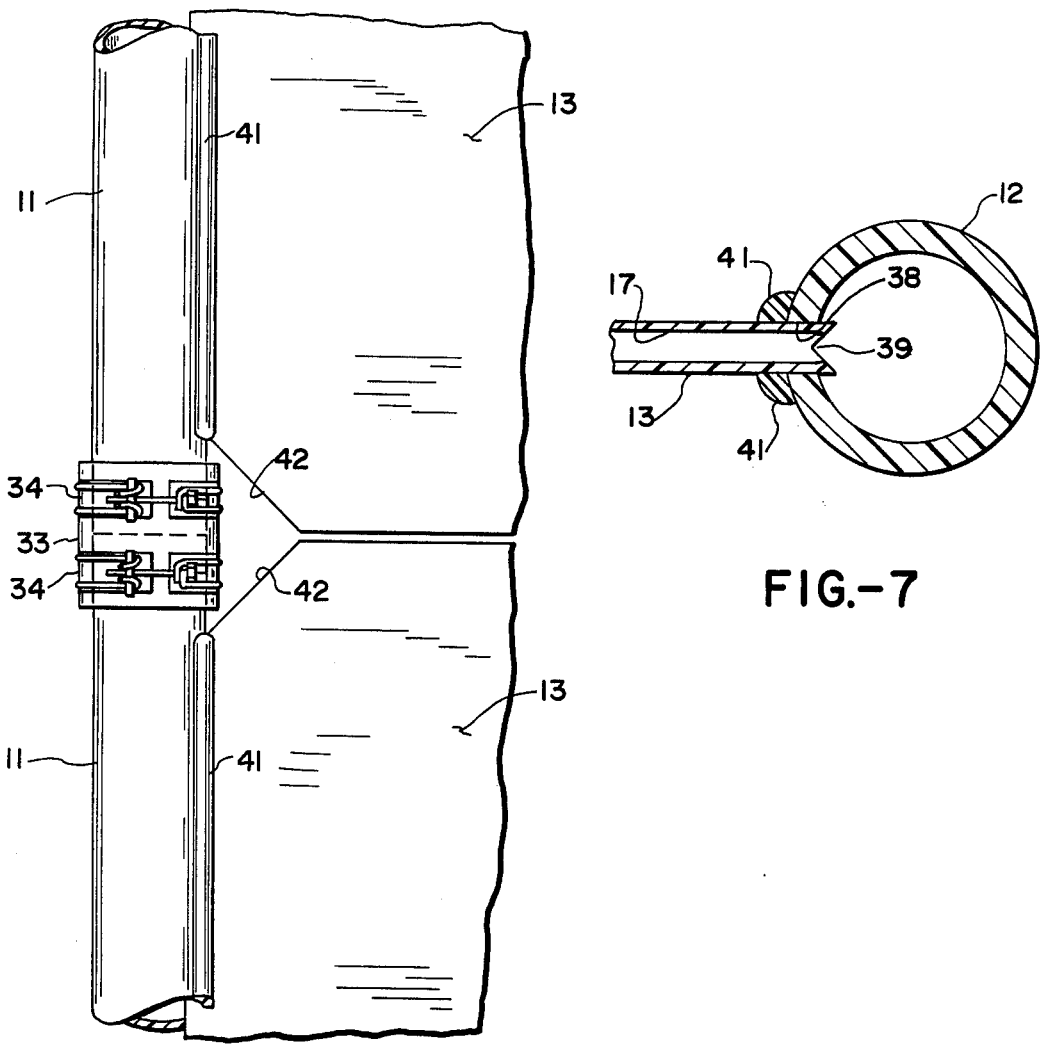

SOLAR HEAT EXCHANGE PANEL AND METHOD OF FABRICATION

This is a continuation, of application Ser. No. 512,492 filed Oct. 7, 1974, now abandoned which was a divisional of Ser. No. 410,630 filed Oct. 29, 1973, now U.S. Pat. No. 3,934,323.

BACKGROUND OF THE INVENTION

The present invention relates to a heat exchange panel and more particularly to a solar heat exchange panel for use in heating fluids such as water in a swimming pool, and to the method of fabricating such a panel.

Solar heating panels for swimming pools are well known. In the past a panel or series of panels has been constructed having an inlet connected to a pump for delivery of water to the panels and an outlet for delivery of water from the panels back to the pool. These panels have used relatively large cross section straight-through or serpentine passage arrangements. The flow path through the panels and the inlet and outlet piping has been subject to leaks due to faults in the many mechanical joints and fittings. Moreover, the complexity of previously available panel assemblies and the low efficiency of heat transfer to the water flow due to the large cross section passages rendered previous solar heaters unattractive. There is, therefore, a need for simple, lightweight, efficient, structurally sound solar heat exchange panel, and for a simple process for fabricating the same.

SUMMARY AND OBJECTS OF THE INVENTION

The solar heating panel disclosed herein is a relatively thin flat sheet having multiple tubular passages running lengthwise therethrough. The panels are cut to a predetermined length and spaced flanges are formed on the panel ends on either side of the tubular passage ends using heated dies. A pair of hollow headers are cut having a length comparable to the width of the panel, and having apertures through one side. The material of the headers and the spaced flanges is heated to the melting point and the headers and flanges are forced together under pressure creating a unitary assembly having a watertight weld between the headers and the panels when the material solidifies. Plenum chambers are formed between the panel ends and the headers. The apertures through the sides of the hollow headers extend into the plenum chambers. An unobstructed flow path is constructed extending from an inlet to one header, through the apertures, one plenum chamber, the tubular passages, the opposite plenum chamber, the apertures in the opposite header, and through the opposite header to an outlet.

In general, it is an object of the present invention to provide an efficient and inexpensive heat exchanger for swimming pools.

It is another object of the present invention to provide a solar heat exchange panel for raising the temperature of the water in a swimming pool.

It is another object of the present invention to provide a heat exchange panel which may be used to cool the water of a swimming pool when the environment is at a lower temperature than the pool water.

Another object of the present invention is to provide a solar heating panel which may be easily fabricated, using a minimum of process steps.

Another object of the present invention is to provide a solar heating panel in modular form which may be assembled into a solar heater which may contain any desired number of heater panel modules.

Additional objects of the present invention will become apparent by referring to the drawings and the description of the preferred embodiment.

BRIEF DESCRIPTION OF THE DRAWING

FIG. 1 is an isometric view of an assembled solar heat exchange panel.

FIG. 2 is a cutaway sectional view of an assembled solar heat exchange panel.

FIG. 3 is a sectional view along the line 3—3 of FIG. 2.

FIG. 4 is an isometric view of a panel prior to processing.

FIG. 4A is an isometric view of a panel cut to a predetermined length.

FIG. 4B is an isometric view of a heater panel undergoing the flange formation process.

FIG. 4C is a sectional view showing the cross-section of the heating die used in the bonding process.

FIG. 4D is an isometric view of a panel and a hollow header undergoing the bonding process.

FIG. 4E is an isometric view showing the unitary assembly resulting from the bonding process.

FIG. 5 is a detailed view of the area 5—5 of FIG. 4.

FIG. 6 is a partial plan view showing two unitary heat exchange assemblies joined.

FIG. 7 is a sectional view of another embodiment of panel and header assembly.

FIG. 8 is a partial plan view of another embodiment showing two unitary heat exchange assemblies joined.

DESCRIPTION OF THE PREFERRED EMBODIMENTS

The heat exchange panel provides a continuous flow path for a fluid, a portion of the flow path being utilized to exchange heat between the fluid and the panel environment. FIG. 1 shows a unitary heat exchange module 10 having spaced headers 11 and 12 disposed at opposite ends of a heat exchange panel 13.

In one embodiment, best seen in FIG. 2, headers 11 and 12 are hollow and have along one side a line of spaced holes 14. The holes 14 are countersunk as shown at 16 at the outer surface of headers 11 and 12. It should be noted in FIG. 2 that spaced holes 14 in header 11 are positioned in a staggered relationship relative to spaced holes 14 in header 12. Multiple tubular passages 17 extend lengthwise through panel 13 and are defined by the broad outside walls of panel 13 and a plurality of partitions 18 extending therebetween.

Each end of panel 13 is subjected to a forming process. In the embodiment of FIG. 2 spaced flanges 19 and 21 are formed as shown in FIG. 3. Plenum chambers 22 are defined between the ends of panel 13, the spaced flanges 19 and 21, and the outer surfaces of headers 11 and 12 when the headers are joined to panel 13. Identical plenum chambers 22 thus exist at opposite ends of panel 13 as seen in FIG. 2.

Heat exchange panels 13 are cut to shape and the ends are formed from the sheetlike member shown in FIG. 4 for the embodiment of FIG. 2 as follows. FIG. 4A shows the sheet like member cut to a predetermined length for a heat exchange panel 13. FIG. 4B shows the cut panel 13 with spaced flanges 19 and 21 respectively formed by pressing a heated knife edge die 23 into each end of panel 13. Knife edge die 23 is heated to a predetermined temperature, approximately 350° F for polyethylene panel material, and is pressed into the end of panel 13 at a predetermined rate. The panel material is heated to the plastic range by die 23 thereby allowing die 23 to form the flanges 19 and 21 by forcing apart the ends of panel 13 through which the tubular passages extend. The temperature and rate of advance of knife edge die 23 are important so that flanges 19 and 21 are formed while causing a predetermined reduction in cross section at the ends of tubular passages 17 without obstructing them completely. Heated die 23 may be advanced at a lower rate during the initial stages of forming and accelerated during the latter stages to assure that the channel ends are not fully closed. Once the spaced flanges 19 and 21 are formed, a coolant is injected about the die and the flanges as indicated by arrow 24 in FIG. 4B so that die 23 may be removed from contact with the end of panel 13 without altering the shape of flanges 19 and 21 as formed. The coolant solidifies the material of panel 13 prior to removal of the die 23.

The headers 11 and 12 are cut to a length which is approximately the width of panel 13. A line of spaced holes 14 having a countersink 16 is placed through the wall of headers 11 and 12. The holes 14 generally have a diameter which is in a ratio of 1:16 relative to the inside diameter of headers 11 and 12. By way of example, ⅛ inch diameter holes 14 are optimum for 2 inch diameter headers 11 and 12. The consideration is to obtain an optimum trade-off between head loss due to flow constriction and constant flow distribution throughout a plurality of panels 13.

A heated bonding die 26 for the embodiment of FIG. 2 has four projections 27 extending therefrom as best shown in FIG. 4C. Projections 27 each have a planar surface on their ends shown at 28, 29, 31, and 32 in FIG. 4C. Planar surfaces 28 and 31 are parallel and surfaces 29 and 32 are parallel.

Referring to FIG. 4D, heated bonding die 26 is positioned between panel 13 having flanges 19 and 21 formed thereon, and hollow header 12. Bonding die 26 is heated to the range of 450° to 600° F for the case when the material of panel 13 and header 12 is polyethylene. Planar surface 28 contacts the face of flange 19 and planar surface 29 contacts the face of flange 21. Surfaces 31 and 32 on die 26 contact the outside of hollow header 12 astraddle the line of holes 14. Panel 13 and header 12 are held in contact with heated die 26 until the surface material of the panel 13 and header 11 or 12 adjacent to the planar surfaces is melted. As soon as the surface material is melted, panel 13 and header 11 or 12 are drawn apart, die 26 is moved from between them, and the substantially parallel melted surfaces of panel 13 and header 11 or 12 are pressed together to form the unitary assembly 10, one end of which is shown in FIG. 4E. The material of panel 13 and headers 11 and 12 solidifies on cooling to form a fluid impervious bond.

The type of material used for the heat exchange panel 13 and upper and lower headers 11 and 12 will dictate to some extent the process used in fabricating the unitary assembly 10. There being no satisfactory bonding agents or solvents at the present time for polyethylene, heat forming and bonding methods are used. Use of other materials for the panel 13 and headers 11 and 12 or development of adhesives for bonding polyethylene may dictate the use of a particular adhesive or solvent for the bonding process. It is also advantageous to provide some ultraviolet inhibitor in the materials used in the fabrication of the solar heat exchange panel unitary assembly 10.

Unitary heat exchange assemblies 10 may be joined to produce a solar heat exchange array having as many unitary assemblies 10 as desired. As mentioned above, headers 11 and 12 are cut having a length approximately the same as the width of panel 13. The header lengths are cut longer than the panel widths when the method for joining unitary assemblies 10 shown in FIG. 6 is used. As may be seen in FIG. 6, when two unitary assemblies 10 are placed side-by-side the projecting ends of headers 11 and 12 are brought into butting position. A rubber collar 33 is placed around each header butt joint. Clamps 34 are placed around the outside of the collar 33 and tightened to preclude fluid leakage at the header butt joints.

The operation of the embodiment of unitary heat exchange assembly 10 having the configuration of FIG. 2 may now be described. Panels are placed in an environment from which a heat exchange is desired with a particular fluid. In the most common usage, solar heating panels are used to control the temperature of swimming pools. Generally it is desired to elevate the temperature of the water although occasions may arise when it is desirable to depress the temperature of the water. In either instance the unitary heat exchange assemblies 10 are fabricated and joined together using as many unitary assemblies 10 as desired. In general terms the total area of heat exchanger panels 13 should be a minimum of half the area of the swimming pool surface to achieve a reasonable efficiency level. When the application is that of heating the water in a swimming pool the panels may be oriented to generally receive the sun's rays orthogonally on the surface of panel 13. This is not a critical consideration since the heat absorption is related to the cosine function of the angle of incidence of the sun's rays on the surface of panel 13. The panel array may be set up on a roof top, in a field, or in any other convenient position accessible to direct sunlight.

Using the pool pump (not shown) water is pumped into an inlet end 36 shown in FIG. 2 on header 12. The opposite end of header 12 is either connected to additional unitary heat exchange assemblies 10 or is stopped by inserting a plug (not shown) therein. In the embodiment of FIG. 2 water flowing into header 12 passes radially through holes 14 into plenum chamber 22 adjacent to header 12. Header 12 is generally kept at a lower elevation than header 11 whereby the water rises in all of the tubular passages 17 at approximately the same rate until it reaches plenum chamber 22 adjacent upper header 11. The water passes radially through holes 14 into the interior of header 11 flowing therethrough until it exits through one end 37 of header 11 as seen in FIG. 2 whereupon it is directed to return to the pool.

Countersink 16 is placed in holes 14 in this embodiment so that holes 14 will not be partially blocked by flanges 19 and 21 if headers 11 and 12 are slightly rotated relative to heat exchange panel 13 during the heat bonding assembly phase. Holes 14 in header 12 are specifically placed so that they will not lie directly opposite holes 14 in header 11 in the unitary assembly 10. This staggered condition of holes 14 in headers 11 and 12 is for the purpose of reducing preferential water flow routes through heat exchange panel 13. Water is allowed to flow laterally in panel 13 through plenum chambers 22 so that water enters all tubular passages 17. Low resistance to flow would exist in some passages 17 if holes 14 were directly opposite each other in the headers. In this fashion a greater heat exchange efficiency is achieved, since there is fluid in motion beneath the entire surface of panel 13. The flow rates attained across the widths of all of the panels 13 is evidenced by a substantially similar temperature across the array of panels 13 during operation.

An additional embodiment of the unitary heat exchange panel 10 has an external appearance similar to that of FIG. 1, but the cross section equivalent to FIG. 3 appears as shown in FIG. 7. While only header 12 is shown in FIG. 7 an identical construction is utilized at the other end of panel 13 involving header 11. A continuous slot 38 is formed through one wall of header 12. Slot 38 has a length and width sufficient to accept the width and thickness of panel 13 respectively. A restriction of the ends 39 of passages 17 is undertaken on each end of panel 13. The restriction is obtained by either depositing a material which remains permanently affixed in the passage ends 39 or by forming the ends 39 to reduce the cross section of passages 17 at ends 39. The forming process is performed by using a solvent or a heated die on the ends of panel 13 for example.

Assembly of the panel 13 having restricted ends 39 in passages 17 with headers 11 and 12 having slots 38 is accomplished as follows. The end of panel 13 is inserted into slot 38 and bonded in place with the passages 17 in communication with the interior of header 12. An adhesive fillet 41 is placed around the junction between panel 13 and header 12 for sealing of the slot 38 and for providing structural strength in the assembly.

Another embodiment of unitary heat exchange assemblies 10 is shown in FIG. 8. Each corner of panel 13 is cut on a diagonal 42 and the ends of passages 17 terminating at diagonal 42 are sealed closed. Headers 11 and 12 are cut to the same dimension as the width of panels 13. The unitary assemblies 10 when connected together with collar 33 and clamps 34 are positioned so that the edges of panels 13 are abutting. This provides an advantage in space required by a plurality of assemblies 10, but suffers from the disadvantage of losing flow passages 17 on each edge of each panel 13.

The operation of the embodiment of FIG. 7 follows. Inlet fluid is delivered to the interior of header 12. Flow continues through restrictions 39 into passages 17. Heat is exchanged through the walls of panel 13 between the panel environment and the flowing fluid. Fluid exits panel 13 at restrictions 39 at the opposite end of panel 13 entering the interior of header 11. Flow passes from header 11 to a return conduit to a fluid reservoir, such as a swimming pool.

Restrictions 39 are sufficiently small to impede fluid flow enough to prevent preferential flow routes and stagnation in other flow routes through a panel or array of panels 13. It should be noted that flow rates may vary from panel to panel, that stagnation is prevented and an appreciable flow is maintained through all passages 17 of all panels 13.

A unitary heat exchange panel has been disclosed which may be used as a solar heater for swimming pools, and which may be used during the sunlight hours to elevate the temperature of the pool water and during the hours of darkness for depressing the temperature of the pool water if so desired. The heat exchange assembly is of relatively simple construction and lends itself to a fabrication method that is also relatively simple.

We claim:

1. A solar heat exchange panel for exchanging heat energy between a fluid passing through the panel and an external environment, comprising
    a unitary heat exchange panel of a predetermined length and having a plurality of internal parallel passages extending lengthwise through the ends thereof,
    opposite substantially parallel surfaces on said unitary heat exchange panel in contact with the external environment,
    means for impeding flow through each of said plurality of internal parallel passages, so that impedance to preferential flow routes through said unitary heat exchange panel is provided and heat exchange between the flow and the surrounding environment is substantially uniform,
    first and second hollow headers having a plurality of spaced openings therethrough along one side thereof, and a fluid impervious bond between said hollow headers and the ends of said unitary heat exchange panel, said fluid impervious bond being astraddle said plurality of spaced openings, whereby said plurality of internal parallel passages is in communication with the interior of each of said first and second hollow headers, and fluid introduced into said first hollow header traverses said plurality of spaced openings therein, said passages, said means for impeding flow, and said plurality of spaced openings in said second hollow header to emerge therefrom at an outlet temperature induced by the environment surrounding said unitary heat exchange panel.

2. A solar heat exchange panel as in claim 1 together with flanges formed across the ends of said unitary heat exchange panel surrounding the ends of said plurality of internal parallel passages,
    said fluid impervious bond being between said flanges and said first and second hollow headers, said first and second hollow headers and the opposite ends of said unitary heat exchange panel forming first and second plenum chambers therebetween respectively, whereby lateral fluid flow occurs in said first and second plenum chambers, whereby substantially similar flow rates are obtained throughout said plurality of parallel passages.

3. A solar heat exchange panel as in claim 1 wherein said plurality of spaced openings have a predetermined opening size relative to the inside diameters of said first and second hollow headers, whereby a predetermined flow impedance is obtained so that a maximum flow rate is obtained through said unitary heat exchange panel at an essentially uniform flow rate through each of said plurality of internal parallel passages.

4. A solar heating panel for exchanging thermal energy between a fluid flowing therethrough and a surrounding environment, comprising a heat exchange panel of a predetermined length having tubular passages running lengthwise internally and extending through opposite ends of said panel, said heat exchange panel having broad opposing surfaces in direct contact with the surrounding environment, spaced flanges on either side of said tubular passages on each end of said panel extending across the width thereof, first and second hollow headers having a line of spaced holes on one side, a fluid impervious bond between said first and second hollow headers and each of said spaced flanges on opposite ends of said heat exchange panel, with the flanges on the panel ends contacting the outer surface of the headers on opposite sides of the line of spaced holes, said first and second hollow headers and spaced flanges defining first and second plenum chambers therebetween respectively, whereby the fluid flows laterally in said first and second plenum chambers for the purpose of reducing preferential fluid flow routes, and fluid introduced into said first hollow header passes through said holes into said first plenum chamber for lateral flow therein, flows through said tubular passages in said heat exchange panel into said second plenum chamber for lateral flow therein, and flows through said spaced holes into said second hollow header for discharge at a temperature induced by the surrounding environment.

5. A solar heating panel as in claim 4 wherein said spaced holes are countersunk whereby alignment of said line of holes within said first and second plenum chambers is less critical and flow path obstruction by said spaced flanges overlying said holes is avoided.

6. A solar heating panel as in claim 4 wherein said spaced holes in said first hollow header are staggered in opposing relationship with respect to said spaced holes in said second hollow header, whereby fluid flow rate difference through said tubular passages is reduced throughout the width of said heat exchange panel, and heat exchange across the boundaries of said panel is substantially the same throughout the width of said panel.

* * * * *